United States Patent
Viola et al.

(10) Patent No.: US 8,054,066 B2
(45) Date of Patent: Nov. 8, 2011

(54) MAGNETOSTRICTIVE DISPLACEMENT TRANSDUCER WITH PHASE SHIFTED BIAS BURST

(75) Inventors: Uwe Viola, Cary, NC (US); Vladimir Zubenko, Cary, NC (US); Arnold Sprecher, Raleigh, NC (US)

(73) Assignee: MTS Systems Corporation, Eden Prairie, MN (US)

( * ) Notice: Subject to any disclaimer, the term of this patent is extended or adjusted under 35 U.S.C. 154(b) by 864 days.

(21) Appl. No.: 11/956,431

(22) Filed: Dec. 14, 2007

(65) Prior Publication Data

US 2009/0153135 A1  Jun. 18, 2009

(51) Int. Cl.
*G01B 7/14* (2006.01)
(52) U.S. Cl. ......... 324/207.13; 324/207.15; 324/207.24; 324/225
(58) Field of Classification Search .............. 324/207.13
See application file for complete search history.

(56) References Cited

U.S. PATENT DOCUMENTS

| | | | | |
|---|---|---|---|---|
| 4,028,619 A * | 6/1977 | Edwards | ................ | 324/207.13 |
| 4,144,519 A * | 3/1979 | Chamuel | ................ | 367/125 |
| 4,231,260 A * | 11/1980 | Chamuel | ................ | 73/597 |
| 4,447,781 A | 5/1984 | Van Dyke | | |
| 4,721,902 A | 1/1988 | Tellerman et al. | ................ | 324/58.5 |
| 5,043,685 A | 8/1991 | Nyce | ................ | 333/148 |
| 5,070,485 A | 12/1991 | Nyce | ................ | 367/127 |
| 5,206,586 A | 4/1993 | Yauch et al. | ................ | 324/207.13 |
| 5,334,933 A | 8/1994 | Tellerman | ................ | 324/207.13 |
| 5,590,091 A | 12/1996 | Gloden et al. | ................ | 367/140 |
| 5,640,109 A | 6/1997 | Nyce | ................ | 327/73 |
| 5,952,823 A | 9/1999 | Nyce et al. | ................ | 324/207.13 |
| 6,369,563 B1 | 4/2002 | Krahe et al. | ................ | 324/207.13 |
| 6,426,618 B1 | 7/2002 | Nyce et al. | ................ | 324/207.13 |
| 6,459,261 B1 | 10/2002 | Luetzow et al. | | |
| 6,528,990 B1 | 3/2003 | Nyce | ................ | 324/207.13 |
| 6,600,310 B2 | 7/2003 | Nyce et al. | ................ | 324/207.23 |
| 6,600,962 B1 | 7/2003 | Johnson et al. | ................ | 700/66 |
| 6,707,290 B2 | 3/2004 | Nyce et al. | ................ | 324/207.13 |
| 6,791,427 B1 | 9/2004 | Nyce | ................ | 331/143 |
| 7,292,025 B2 | 11/2007 | Sprecher | ................ | 324/207.13 |
| 7,746,066 B2 * | 6/2010 | Steinich et al. | ................ | 324/207.13 |
| 2002/0145419 A1 | 10/2002 | Luetzow et al. | | |
| 2003/0197502 A1 | 10/2003 | Nyce et al. | | |
| 2004/0228216 A1 | 11/2004 | Butler et al. | | |
| 2005/0046513 A1 | 3/2005 | Raphalovitz et al. | | |
| 2007/0240504 A1 | 10/2007 | Barr et al. | ................ | 73/290 |

FOREIGN PATENT DOCUMENTS

WO    WO 98/45932    10/1998

OTHER PUBLICATIONS

Official Search Report of the US Patent Office in counterpart foreign application No. PCT/US 08/13322 filed Dec. 4, 2008.

* cited by examiner

*Primary Examiner* — Patrick Assouad
*Assistant Examiner* — David M. Schindler
(74) *Attorney, Agent, or Firm* — Steven M. Koehler; Westman, Champlin & Kelly, P.A.

(57) ABSTRACT

An assembly includes a magnetostrictive transducer that provides a transducer output. Amplifier circuitry receives the transducer output and generates a transducer output burst and a bias output burst. The transducer output burst and bias output burst overlap in time and differ by a phase difference. A burst processor receives the transducer output burst and the bias output burst. The burst processor provides a displacement output that is a function of a time when the transducer output burst and the bias output burst are at the same voltage level.

21 Claims, 10 Drawing Sheets

MAGNETOSTRICTIVE DISPLACEMENT TRANSDUCER WITH PHASE SHIFTED BIAS BURST

BACKGROUND

The discussion below is merely provided for general background information and is not intended to be used as an aid in determining the scope of the claimed subject matter.

Magnetostrictive displacement transducer assemblies are typically mounted to industrial equipment for use in sensing displacement of a machine part or displacement of a level sensing float. Magnetostrictive displacement electronics are typically enclosed in a housing mounted to a machine or a tank. As the range of applications of magnetostrictive displacement transducers expands, there is a desire to sample displacement at lower displacement jitter levels. The jitter is a small rapid variation in a measured displacement. Displacement is measured as a function of a sonic time delay interval along a magnetostrictive element. The end of the time delay interval is determined by a transducer output burst voltage crossing a nominally fixed bias voltage level. Both the bias voltage level and the transducer output burst voltage include noise. The noise causes a measurement of the end of the time delay interval to jitter excessively. Jitter can be masked by circuit damping, however, damping undesirably limits a response speed of the displacement measurement. There is a desire for a stable, low jitter displacement measurement that is not excessively slowed by damping in a magnetostrictive displacement transducer assembly.

SUMMARY

This Summary and the Abstract are provided to introduce some concepts in a simplified form that are further described below in the Detailed Description. The Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

Disclosed is an assembly. The assembly comprises at least a first magnetostrictive transducer. The first magnetostrictive transducer provides a first transducer output.

The assembly comprises amplifier circuitry. The amplifier circuitry receives the first transducer output and generates a transducer output burst and a bias output burst. The transducer output burst and bias output burst overlap one another in time. The transducer output burst and the bias output burst differ from one another by a phase difference.

According to a further embodiment, the assembly comprises a burst processor circuit. The burst processor circuit receives the transducer output burst and the bias output burst. The burst processor circuit provides a displacement output that is a function of a detection of a time when the transducer output burst and the bias output burst are at the same voltage level.

DETAILED DESCRIPTION

In the embodiments described below, jitter in a displacement output of a magnetostrictive transducer assembly is reduced without the use of excessive output damping, and resolution is improved while maintaining sampling speed. A magnetostrictive transducer provides a transducer output. Amplifier circuitry receives the transducer output and generates a transducer output burst and a bias output burst. The transducer output burst and bias output burst overlap in time and differ by a phase difference. A burst processor receives the transducer output burst and the bias output burst. The burst processor provides a displacement output that is a function of a time when the transducer output burst and the bias output burst cross at the same voltage level.

Figure 1:
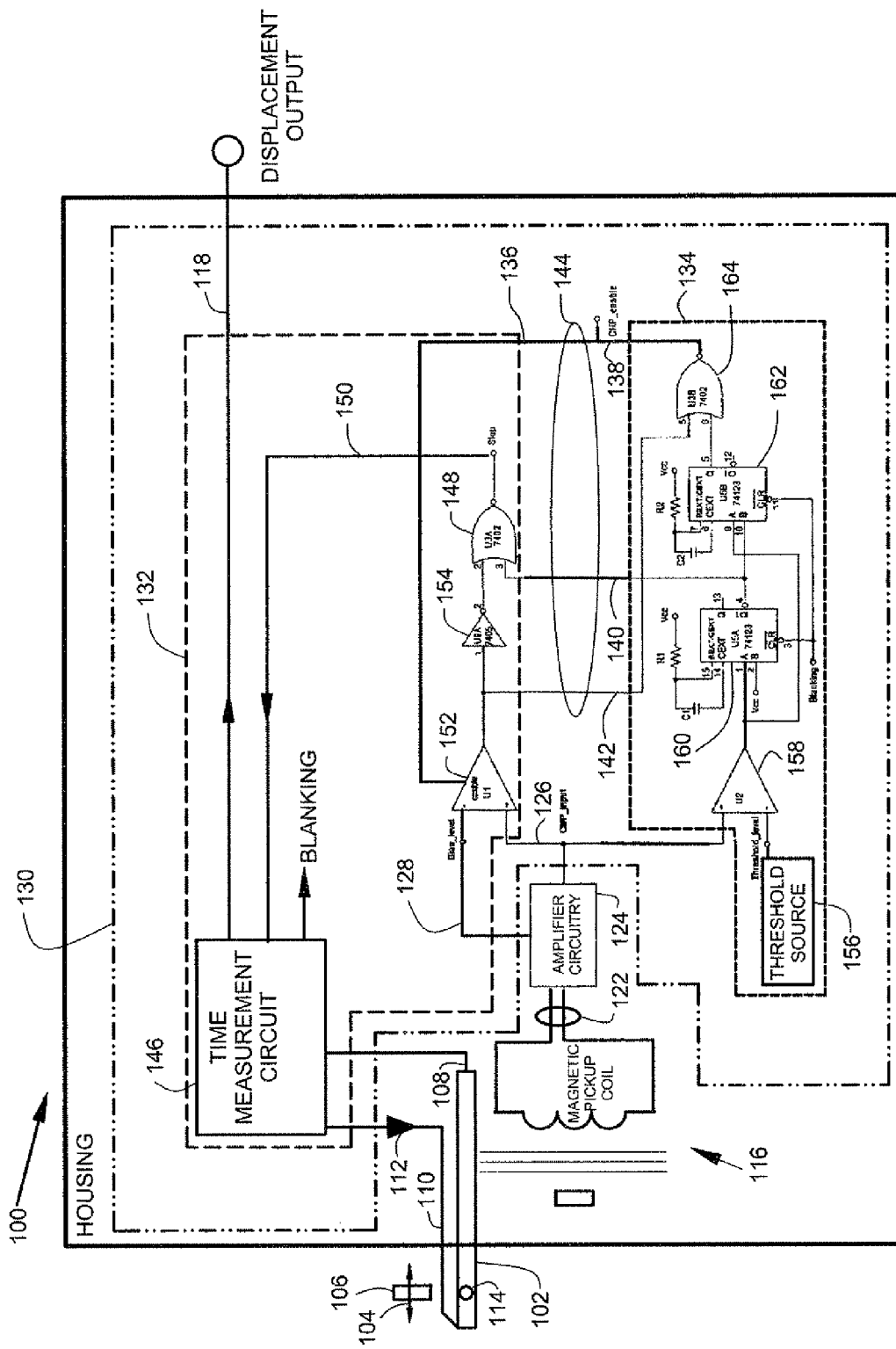
FIG. 1 illustrates a transducer assembly.

FIG. 1 illustrates a transducer assembly 100 coupled to a magnetostrictive element 102. The magnetostrictive element 102 extends alongside a displacement path 104 of a magnet 106 and senses displacement of the magnet 106. The magnet 106 is attached to a moving part such as a moving machine part or a moving float in a tank (not illustrated). The magnet 106 moves relative to the magnetostrictive element 102. The magnetostrictive element 102 extends to the transducer assembly 100. Electrical leads 108, 110 provide a series of repetitive electric current pulses 112 that flow along the length of the magnetostrictive element 102.

The magnet 106 produces an external magnetic field that extends to the magnetostrictive element 102. The external magnetic field magnetizes an adjacent local region 114 of the magnetostrictive element 102 in a first direction approximately transverse to the length of the magnetostrictive element 102. As the current pulses 112 pass through the magnetostrictive element 102, the current pulses produce an internal magnetic field in the magnetostrictive element 102. The internal magnetic field is sufficiently large to overcome the external magnetic field from magnet 106. The magnetization in the local region 114 of the magnetostrictive element 102 abruptly changes direction from an approximately transverse direction to an approximately concentric direction around a major axis of the magnetostrictive element 102. Due to the magnetostrictive properties of the magnetostrictive element 102, the abrupt change in magnetic field direction produces a corresponding abrupt local dimension change (mechanical pulse) of the magnetostrictive element 102.

The mechanical pulse travels along the length of the magnetostrictive element 102 at sonic speed from the local region 114 to the transducer assembly 100 where the pulse is detected by a magnetostrictive transducer 116. The magnetostrictive element 102 functions as a sonic delay line. A sonic time delay between application of the electrical pulse 112 and the detection of the mechanical pulse at transducer 116 is representative of displacement (position) of the magnet 106. The transducer 116 can comprise a bias magnet and a coil wound around a tape core, a coil without a core, a piezoelectric sensor, a magnetoresistive sensor, a giant magnetoresistive (GMR) sensor, a hall effect sensor, a SQUID sensor or other know sensor (or sensors) that can detect the mechanical pulse. The transducer 116 senses either a magnetic or a mechanical disturbance of the magnetostrictive element 102, depending on the type of magnetostrictive transducer selected. The transducer assembly 100 includes electronic circuitry that generates the repetitive pulse 112, measures the time delay, and provides a displacement output 118 that is representative of displacement of the magnet 106. According to one aspect, the displacement output 118 comprises a digital bus signal according to a digital communication protocol such as Profibus or Canbus protocols.

The transducer assembly 100 comprises the transducer 116 that senses repetitive pulses 120 from the magnetostrictive element 102. The transducer 116 provides at least one transducer output 122. The transducer output 122 couples to amplifier circuitry 124. The amplifier circuitry 124 amplifies and filters the transducer output 122. The amplifier circuitry 124 provides a transducer burst output 126 that comprises transducer output bursts. The amplifier circuit 124 provides a bias burst output 128 that comprises bias output bursts. The term "burst" as used in this application refers to a portion of an output waveform that comprises a group of a few sinusoidal cycles that have a common wavelength and frequency and a damped waveform envelope. Each group, which includes multiple sinusoidal cycles, corresponds with a single electrical pulse 112, but is sonically delayed relative to the electrical pulse 112. The transducer output bursts and the bias output bursts overlap one another in time and differ by a phase difference as illustrated in FIGS. 2, 5, 7, and 9.

The transducer burst output 126 and the bias burst output 128 couple to a burst processing circuit 130. The burst processing circuit 130 repetitively detects timing of the transducer burst output 126. The burst processing circuit 128 provides the output 118 that is representative of displacement.

According to one aspect, the burst processing circuit 130 comprises a transducer circuit 132 and a sequence circuit 134. The sequence circuit 134 couples to the transducer circuit 132 along a control bus 144. The control bus 144 comprises outputs 138, 140, 142. The transducer circuit 132 receives the bias burst output 128 (e.g., bias output bursts) and the transducer burst output 126 (e.g., transducer output bursts). The transducer circuit 132 provides the displacement output 118 that is a function of a detection of a time when the transducer output burst and the bias output burst cross (i.e., are at the same voltage level). The sequence circuit 134 receives the transducer burst output 126 (e.g., transducer output bursts) and controls sequencing of the transducer circuit 132 through use of the control bus 144.

The transducer circuit 132 includes a time measurement circuit 146. The time measurement circuit 146 measures timing of the transducer output bursts on the transducer burst output 128 relative to the timing of the current pulses 112 on lines 108, 110. The time measurement circuit 146 calculates the displacement output 118 as a function of the relative timing and a known sonic velocity of pulse propagation along the magnetostrictive element 110. The sonic velocity can be determined from testing of the magnetostrictive element 102, or from calibration of the transducer circuit 132.

The sequence circuit 134 detects an early portion of the transducer output burst on transducer burst output 126, and this early portion triggers timing of a sequence of control outputs of the sequence circuit 134. The sequence circuit 134 provides a control output 140 to the transducer circuit 132. The control output 140 defines a time window during which timing of a later portion of the burst can be detected.

The transducer circuit 132 comprises a NOR gate 148. The NOR gate 148 generates a gate output 150 that couples to the time measurement circuit 146. The generation of the electric current pulse 112 starts a measurement time interval (also called measurement cycle). The gate output 150 ends the measurement time interval.

The sequence circuit 134 receives the transducer burst output 126. The sequence circuit 134 receives a gate output 142 from the transducer circuit 132. The sequence circuit 134 provides sequence control outputs 138, 140 to the transducer circuit 132. The group of sequence circuit inputs and outputs 138, 140, 142 are collectively called the control bus 144. The function and timing of the transducer circuit 132, the sequence circuit 134, and the control bus 144 are described in more detail below by way of an example timing diagram in FIG. 2.

The transducer circuit 132 comprises a comparator 152, an inverter 154 and the NOR gate 148. The comparator 152 (also called U1) compares the bias burst output 128 to the transducer burst output 126. When the comparator 152 is enabled by the sequence control output 136, the comparator 152 provides the gate output 142 that indicates whether the transducer burst output 126 has crossed (i.e., has the same voltage as) the bias burst output 128. The gate output 142 of comparator 152 couples to an input of the inverter 154. The inverter 154 provides an inverter output that couples to a first input of NOR gate 148. A second input of NOR gate 148 receives the sequence control output 140. An output of the NOR gate 148 provides the gate output 150 that couples to the time measurement circuit 146.

The sequence circuit 134 comprises a fixed threshold voltage source 156, a comparator 158, a first one-shot circuit 160, a second one-shot circuit 162 and a NOR gate 164. The threshold source 156 couples a substantially fixed threshold voltage level to a first input of the comparator 158. The transducer burst output 126 couples to a second input of the comparator 158. The comparator 158 generates a comparator output that couples to "A" inputs of the first and second one-shot circuits 160, 162. The comparator output triggers the first and second one shot circuits 160, 162. The output of comparator 158 switches when the transducer burst output 126 crosses (i.e., is equal to) the threshold voltage level. According to one aspect, the one-shot circuits 160, 162 comprise a dual retriggerable one-shot type 74×123 available from National Semiconductor Corporation of Arlington, Tex. USA, as well as from other integrated circuit manufacturers. The first one-shot circuit 160 is connected to a first RC circuit R1-C1 to function as a first timer with a first time constant. The second one-shot circuit 162 is connected to a second RC circuit R2-C2 to function as a second timer with a second time constant.

A/Q (also called "NOT Q") output of the first one-shot circuit 160 generates the sequence control output 140. A Q output of the second one-shot circuit 162 couples to a first input of the NOR gate 164. The gate output 142 from the comparator 152 couples to a second input of the NOR gate 164. An output of the NOR gate 164 generates the sequence output 136.

Figure 2:
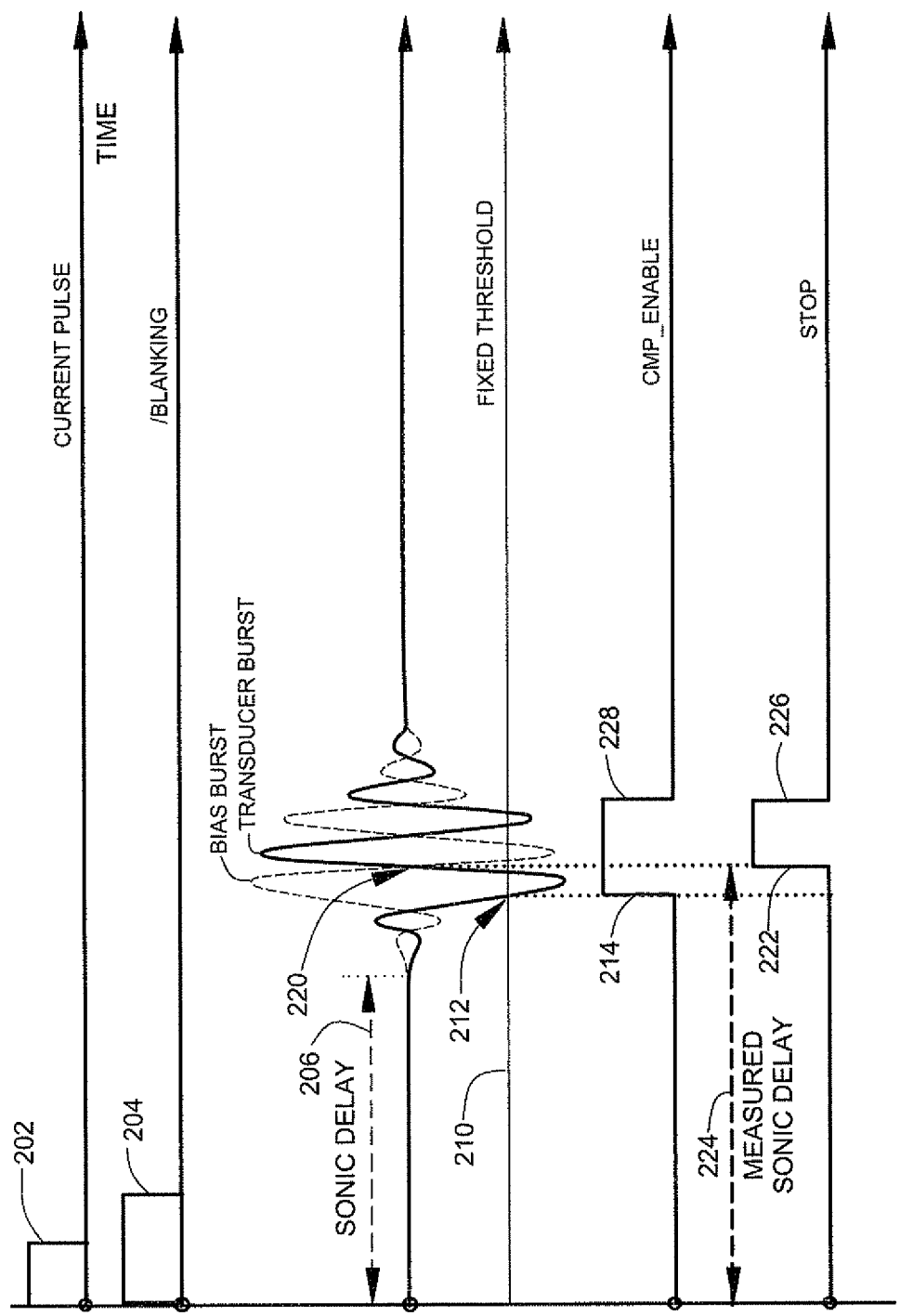
FIG. 2 illustrates a timing diagram associated with the transducer assembly illustrated in FIG. 1.

FIG. 2 illustrates an exemplary timing diagram for the circuitry of FIG. 1. Time axes in FIG. 2 are represented by horizontal lines, and multiple outputs and conditions are illustrated vertically along the time axes. The portion of time shown in FIG. 2 is illustrative of a measurement cycle starting at a starting time of a current pulse 112 (FIG. 1) on the left side of the timing diagram FIG. 2.

In FIGS. 1-2, a current pulse 202 (FIG. 2) is applied to the magnetostrictive element 102, starting the measurement cycle. The time measurement circuit 146 (FIG. 1) generates a blanking pulse 204 (FIG. 2). The blanking pulse 204 is coupled to/CLEAR (also called "NOT CLEAR") inputs of the one-shots 160, 162 to ensure that the one-shots 160, 162 are cleared and ready to be triggered.

After a variable sonic time delay 206 (dependent on a displacement of magnet 106), a transducer burst (also called a ringing pulse) is present at the transducer burst output 126 if (solid line waveform in FIG. 2) and at the bias burst output 128 (dashed line waveform in FIG. 2). When the transducer burst output 126 first exceeds a fixed voltage threshold level 210 (from threshold source 156) at time 212, then the sequence output 138 (also called CMP_enable) switches to a high state at time 214.

When the transducer burst output 126 exceeds the bias burst output 128 at time 220, then the gate output 150 (also called Stop) changes at a time 222. The gate output 150 couples to the time measurement circuit 146 and stops counting a measured sonic delay 224 in the time measurement circuit 146 at time 220. The measured sonic delay 224 typically differs from the sonic delay 206 by a substantially fixed time interval, and this substantially fixed time difference is cancelled out of the output during calibration so that the displacement output 118 is accurate.

At a time 228 CMP_enable switches low, and at a time 228, gate output 150 (Stop) switches low. The critical measurement of time 220 is used to calculate displacement.

It is understood by those skilled in the art that a timing diagram, such as the timing diagram in FIG. 2 is a simplified representation and does not show all noise and other artifacts that may be present at various outputs.

Figure 3:
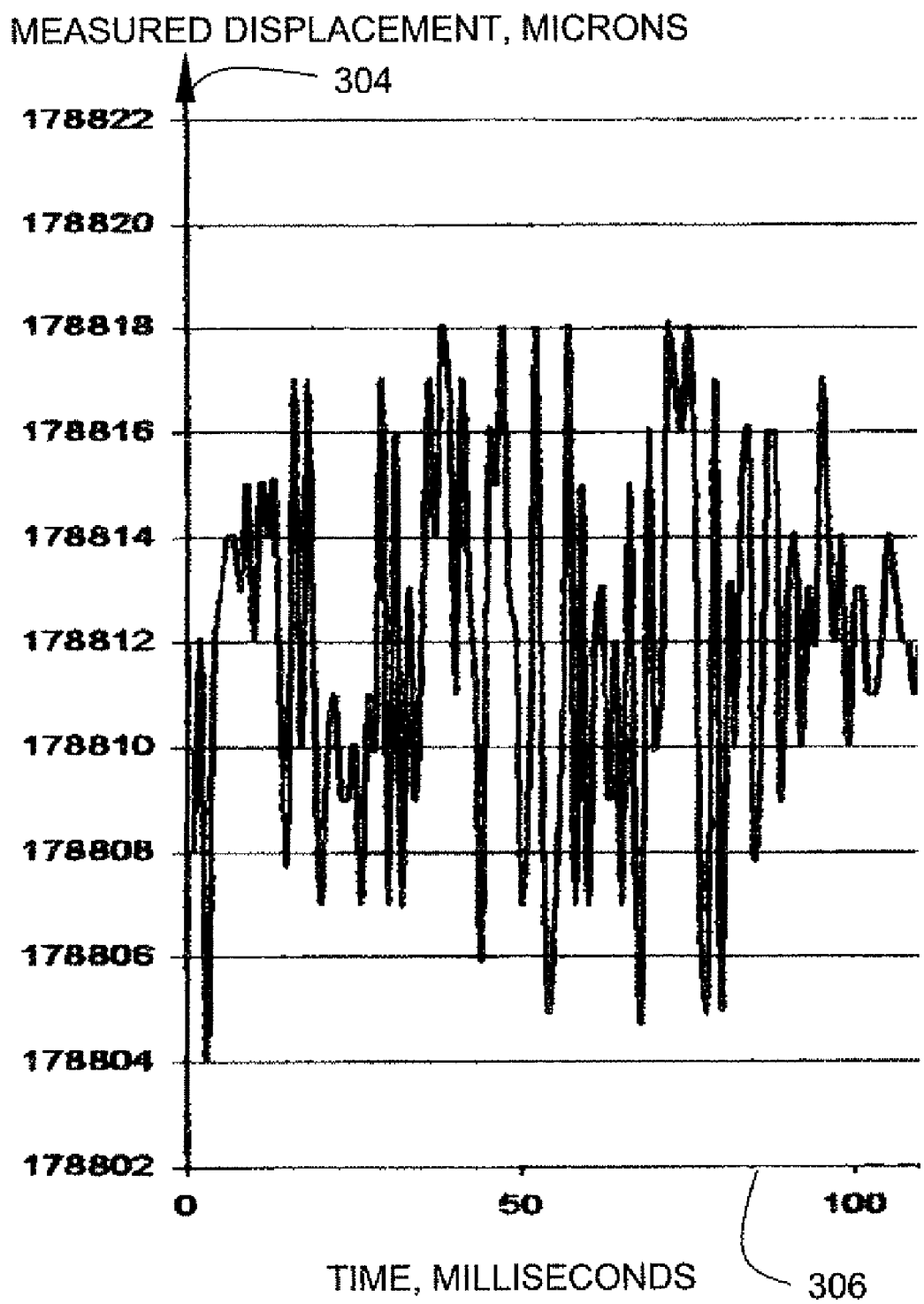
FIG. 3 illustrates jitter on a displacement output of a transducer assembly with a fixed bias level.

FIG. 3 illustrates a displacement output that includes jitter and that does not include the bias burst output shown in FIG. 1, but instead includes a fixed bias. In FIG. 3, a horizontal axis 306 represents time in milliseconds, and a vertical axis 304 represents measured displacement in microns. In FIG. 3, a moving magnet is in a fixed position. It can be seen by inspection of FIG. 3, that displacement jitter can be as high as 15 microns peak-to-peak. Jitter such as that shown in FIG. 3 is substantially reduced by providing a bias burst output. This reduction in jitter is explained in more detail below in connection with examples illustrated in FIGS. 10-11.

Figure 4:
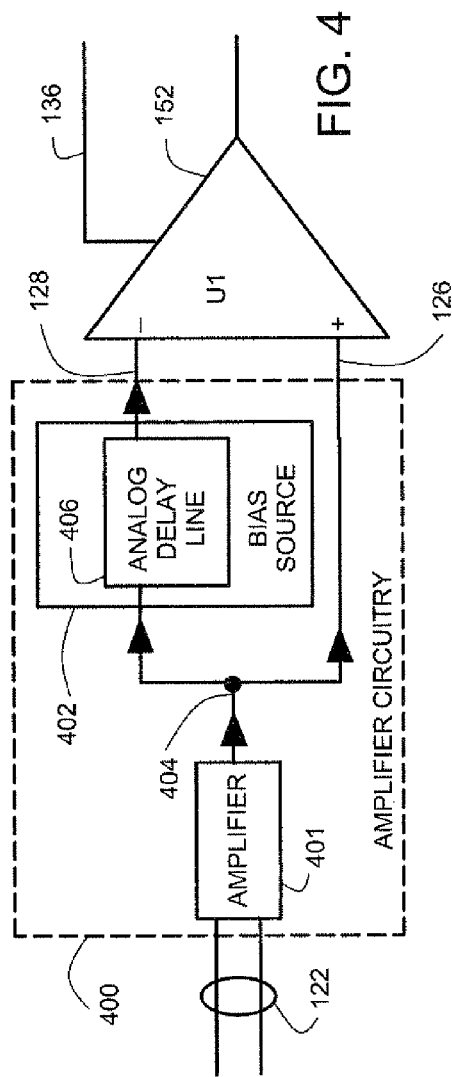
FIG. 4 illustrates a portion of a transducer assembly that includes a comparator that compares an amplified output to an output of an analog delay line.
Figure 5:
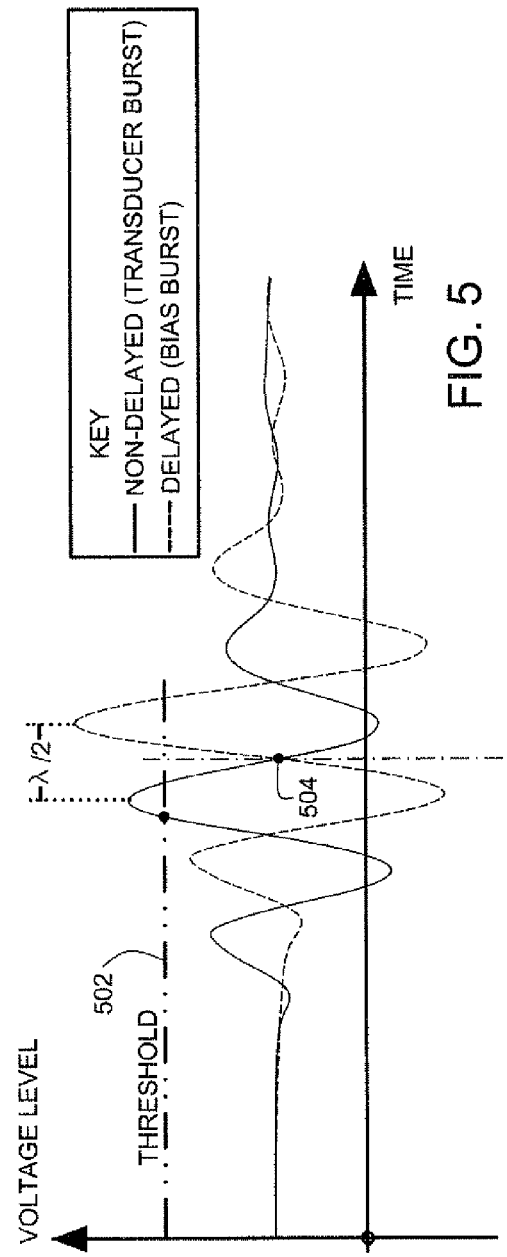
FIG. 5 illustrates a graph of a crossover between an amplified output and a delayed output in FIG. 4.

FIG. 4 illustrates an exemplary embodiment 400 of the amplifier circuitry 124 in FIG. 1. The amplifier circuitry 400 includes an amplifier 401 that receives the transducer output 122 (FIG. 1). The amplifier 401 provides an amplifier output 404. The amplifier output 404 is coupled to the comparator 152 (FIG. 1) as the transducer burst output 126. The amplifier output 404 couples to an input of a bias source circuit 402. The bias source circuit 402 includes an analog delay line 406. An output of the analog delay line 406 is coupled to the comparator 152 as the bias burst output 128. According to one aspect, the bias source 402 provides an approximately 180 degree ($\lambda$/2) delay based on the sinusoidal frequency of oscillation of a burst (such as the bursts illustrated in FIG. 5). As shown in FIG. 5, after the transducer burst output reaches a threshold level 502, then the next crossover 504 of the transducer burst output and the bias burst output is detected to stop time measurement. The crossover 504 stops counting of the measured sonic delay. The analog delay line 406 provides the desired phase difference between the transducer burst output 126 and the bias burst output 128.

Figure 6:
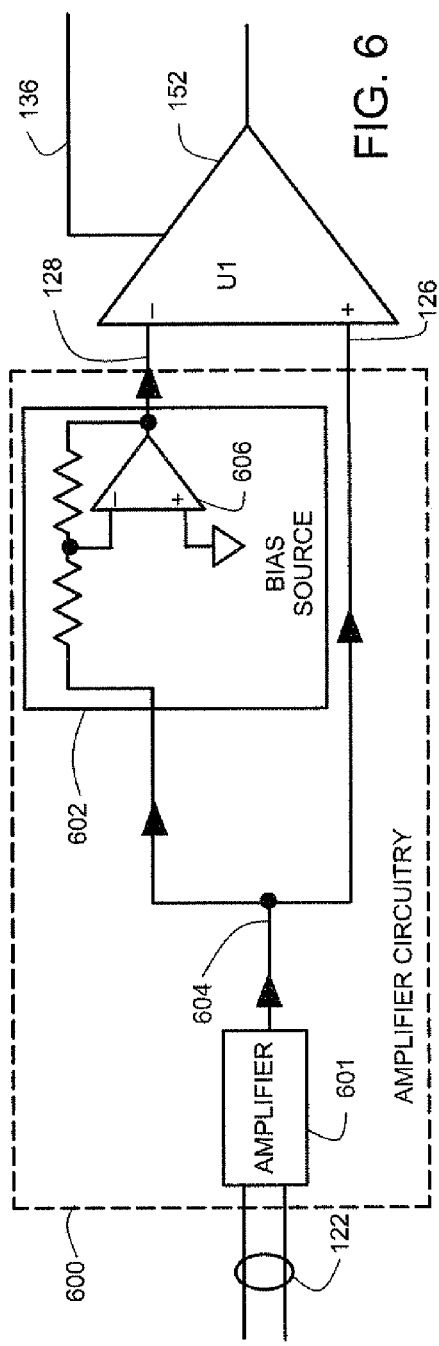
FIG. 6 illustrates a portion of a transducer assembly that includes a comparator that compares an amplified output to an output of an inverter.
Figure 7:
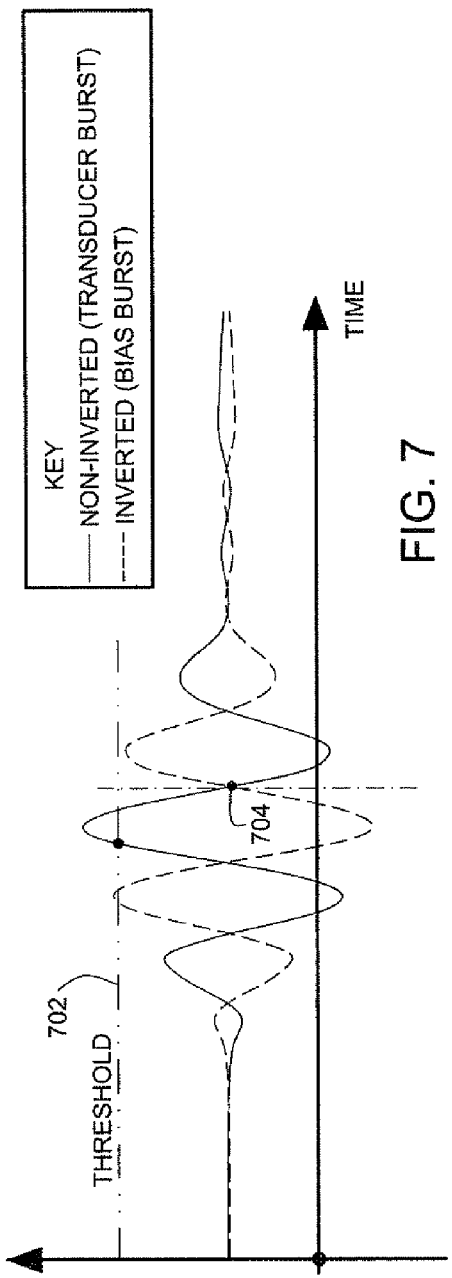
FIG. 7 illustrates a graph of a crossover between an amplified output and an inverter output in FIG. 6.

FIG. 6 illustrates an exemplary embodiment 600 of the amplifier circuitry 124 in FIG. 1. The amplifier circuitry includes an amplifier 601 that receives the transducer output 122 (FIG. 1). The amplifier 601 provides an amplifier output 604. The amplifier output 604 is coupled to the comparator 152 (FIG. 1) as the transducer burst output 126. The amplifier output 604 couples to an input of a bias source circuit 602. The bias source circuit 402 includes an inverting analog amplifier 606. An output of the inverting analog amplifier 406 is coupled to the comparator 152 as the bias burst output 128. According to one aspect, the bias source 602 provides an approximately 180 degree ($\lambda$/2) inversion based on the sinusoidal frequency of oscillation of a burst (such as the bursts illustrated in FIG. 7). As shown in FIG. 7, after the transducer burst output reaches a threshold level 702, then the next crossover 704 of the transducer burst output and the bias burst output is detected to stop time measurement. The crossover 704 stops counting of the measured sonic delay. The analog inverter 606 provides the desired phase difference between the transducer burst output 126 and the bias burst output 128.

Figure 8:
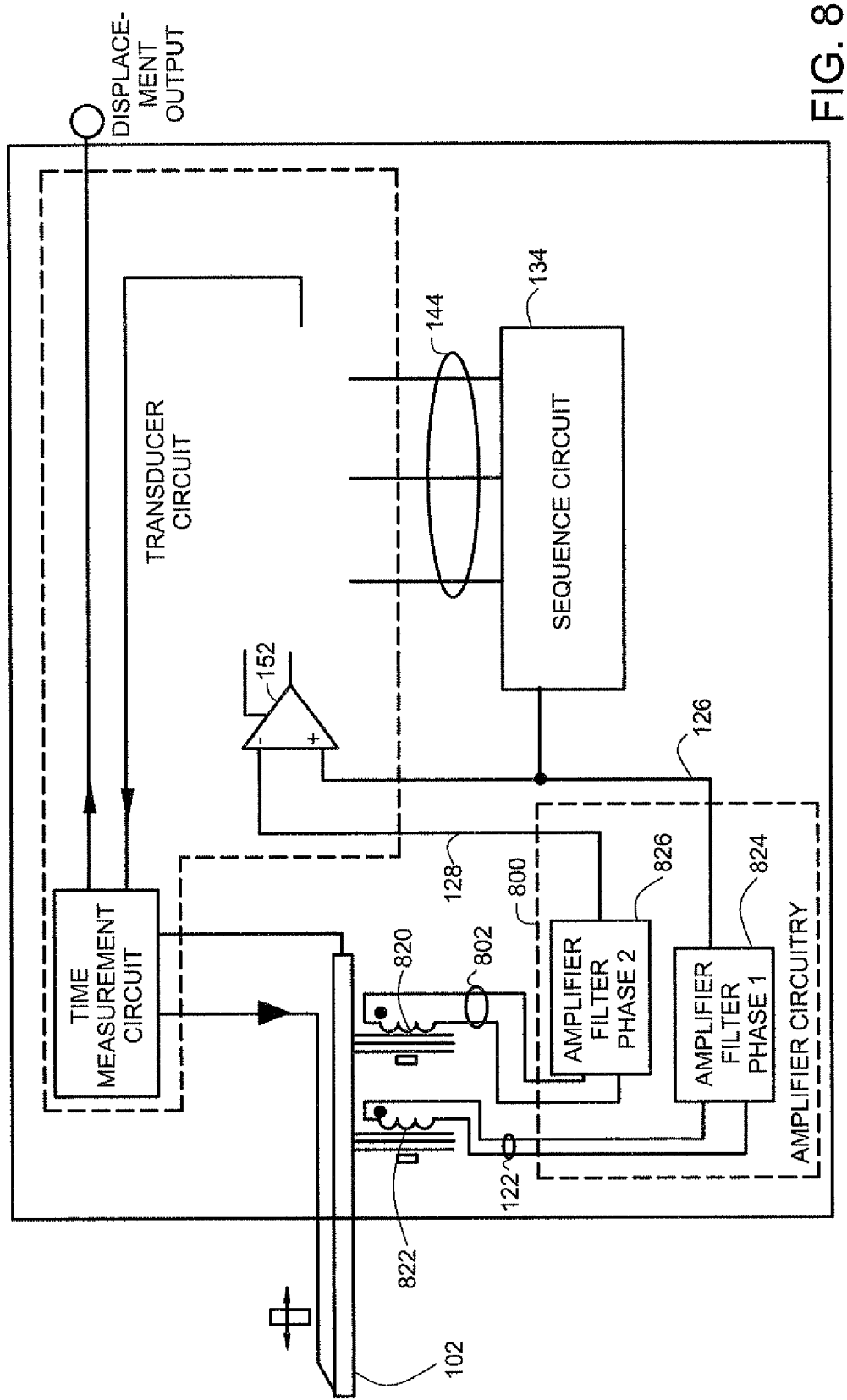
FIG. 8 illustrates a portion of a transducer assembly in which a first transducer and a second transducer are spaced apart along a magnetostrictive element by a distance provides a delay or phase shift between transducer outputs.

FIG. 8 illustrates use of a first transducer 822 and a second transducer 820 that are spaced apart along the magnetostrictive element 102 by a distance (N'$\lambda$/2) where N is an integer 0, 1, 2, . . . and $\lambda$' is a distance wavelength associated with the sinusoidal oscillations in a burst. The distance wavelength $\lambda$' is related to the time wavelength $\lambda$ by the formula distance wavelength ($\lambda$') equals rate (sonic velocity) multiplied times the time wavelength ($\lambda$). The two spaced-apart transducers 820 and 822 provide transducer outputs similar to one another, that overlap in time and differ from one another by a delay. FIG. 8 also illustrates an embodiment 800 of the amplifier circuitry 124 in FIG. 1.

The first transducer 822 couples a first transducer output 122 to a first amplifier filter 824. The first amplifier filter 824 provides a transducer burst output 126 to the comparator 152. The second transducer 820 couples a second transducer output 802 to a second amplifier filter 826. The second amplifier filter 826 provides a bias burst output 128 to the comparator 152. The transducer burst output 126 and the bias burst output 128 overlap one another in time and differ by a phase difference.

Figure 9:
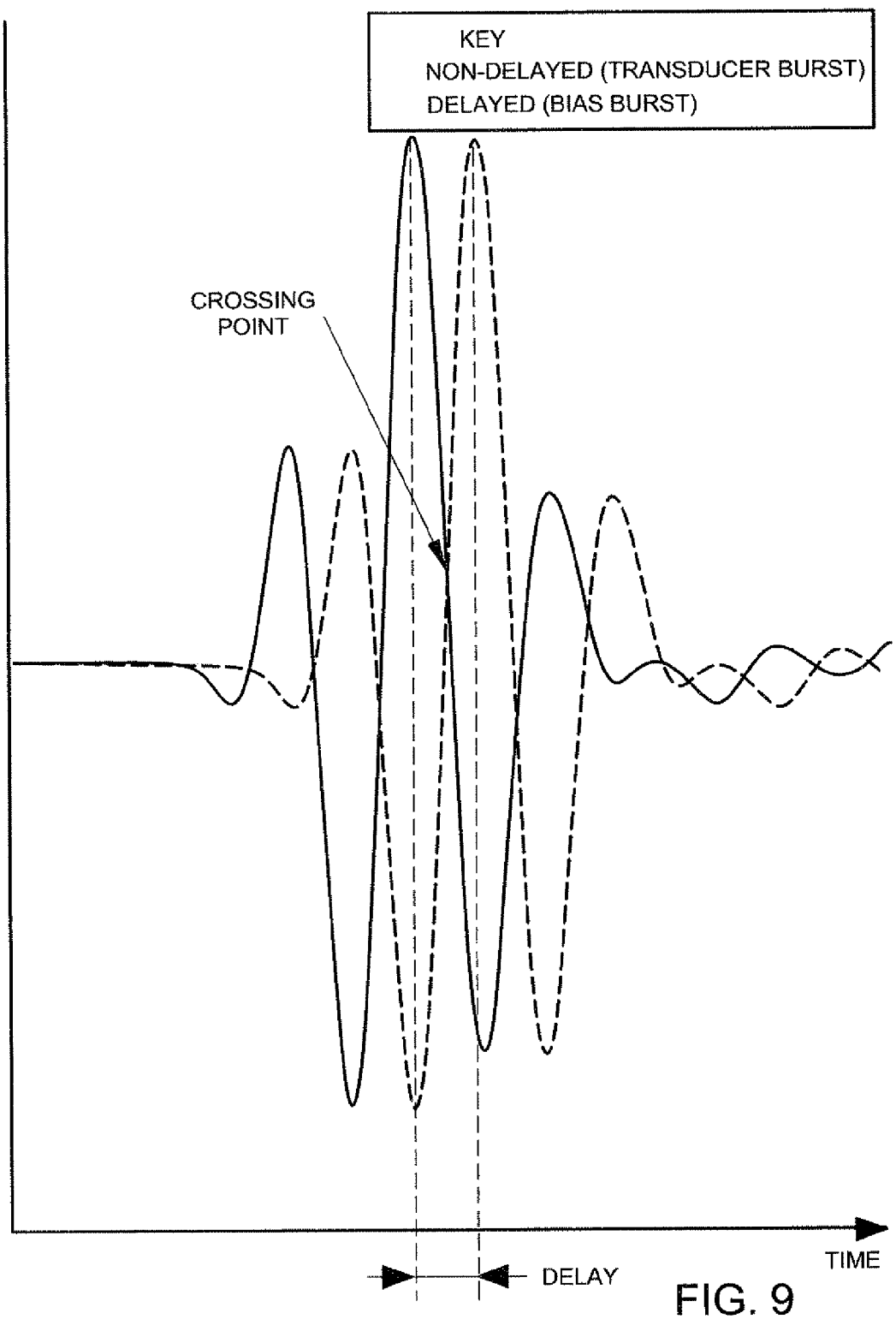
FIG. 9 illustrates a graph of a crossover between a transducer burst and a bias burst in FIG. 8.

FIG. 9 illustrates waveforms of overlapping bursts of the transducer burst output 126 and the bias burst output 128 in FIG. 8.

Figure 10:
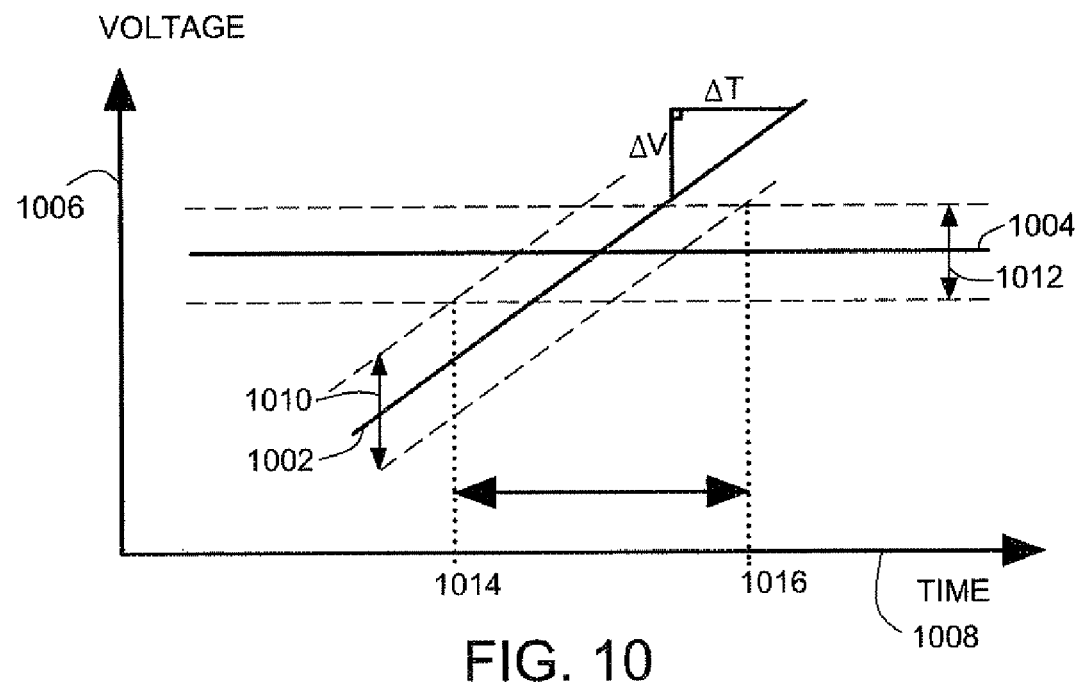
FIG. 10 illustrates a graph of crossover between a transducer burst and a fixed bias voltage.

FIG. 10 illustrates an enlarged graph of crossover of a transducer burst output 1002 with a fixed bias voltage 1004. In FIG. 10, a vertical axis 1006 represents voltage and a horizontal axis 1008 represents time. The amplified output has a nominal slope dV/dT=$\Delta$V/$\Delta$T. The fixed bias voltage has a nominal slope dV/dT=0. The amplified output 1002 is noisy and has a noise amplitude band 1010 indicated by dashed lines. The fixed voltage bias 1004 is noisy and has a noise amplitude band 1012 indicated by dashed lines. Depending on instantaneous noise conditions, the crossover can occur anywhere that the noise amplitude bands 1010, 1012 intersect in a jitter window between time 1014 and time 1016.

Figure 11:
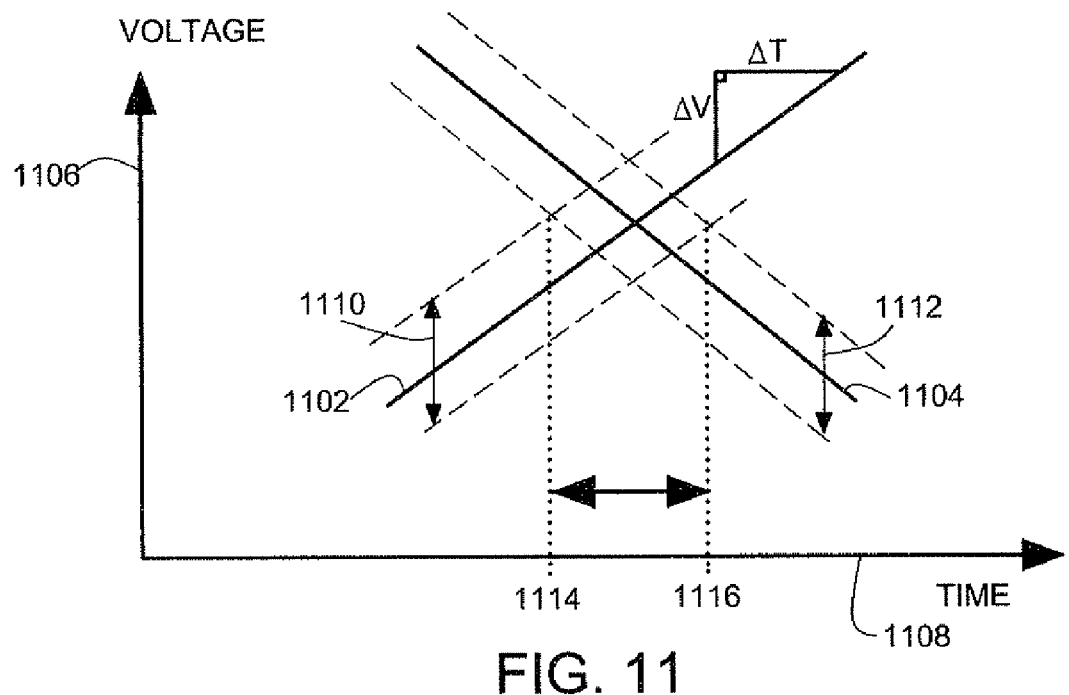
FIG. 11 illustrates a graph of crossover between a transducer burst and a bias burst with a $\lambda/2$ phase shift.

FIG. 11 illustrates a graph of crossover of a transducer burst output 1102 with a λ/2 phase shifted bias burst output 1104. In FIG. 11, a vertical axis 1106 represents voltage and a horizontal axis 1108 represents time. The transducer burst output 1102 has a nominal slope dV/dT=ΔV/ΔT that is the same slope value as the transducer burst output 1002 in FIG. 10. The λ/2 phase shifted bias burst output 1104 has a nominal slope dV/dT=−ΔV/ΔT. The transducer burst output 1102 is noisy and has a noise amplitude band 1110 indicated by dashed lines. The λ/2 phase shifted bias burst output 1104 is noisy and has a noise amplitude band 1112 indicated by dashed lines. Depending on instantaneous noise conditions, the crossover can occur anywhere that the noise amplitude bands 1110, 1112 intersect in a jitter window between time 1114 and time 1116. It can be seen from inspection of FIGS. 10 and 11 that the jitter window in FIG. 11 is smaller than the jitter window in FIG. 10 for the same nominal slope. When transducer signals are in the lower part of the dynamic range of transducer signals, the slope dV/dT is lower, and the improvements in jitter from using phase shift is greatest. The use of a bias burst output reduced the size of the jitter window in comparison to use of a fixed bias.

Figure 12:
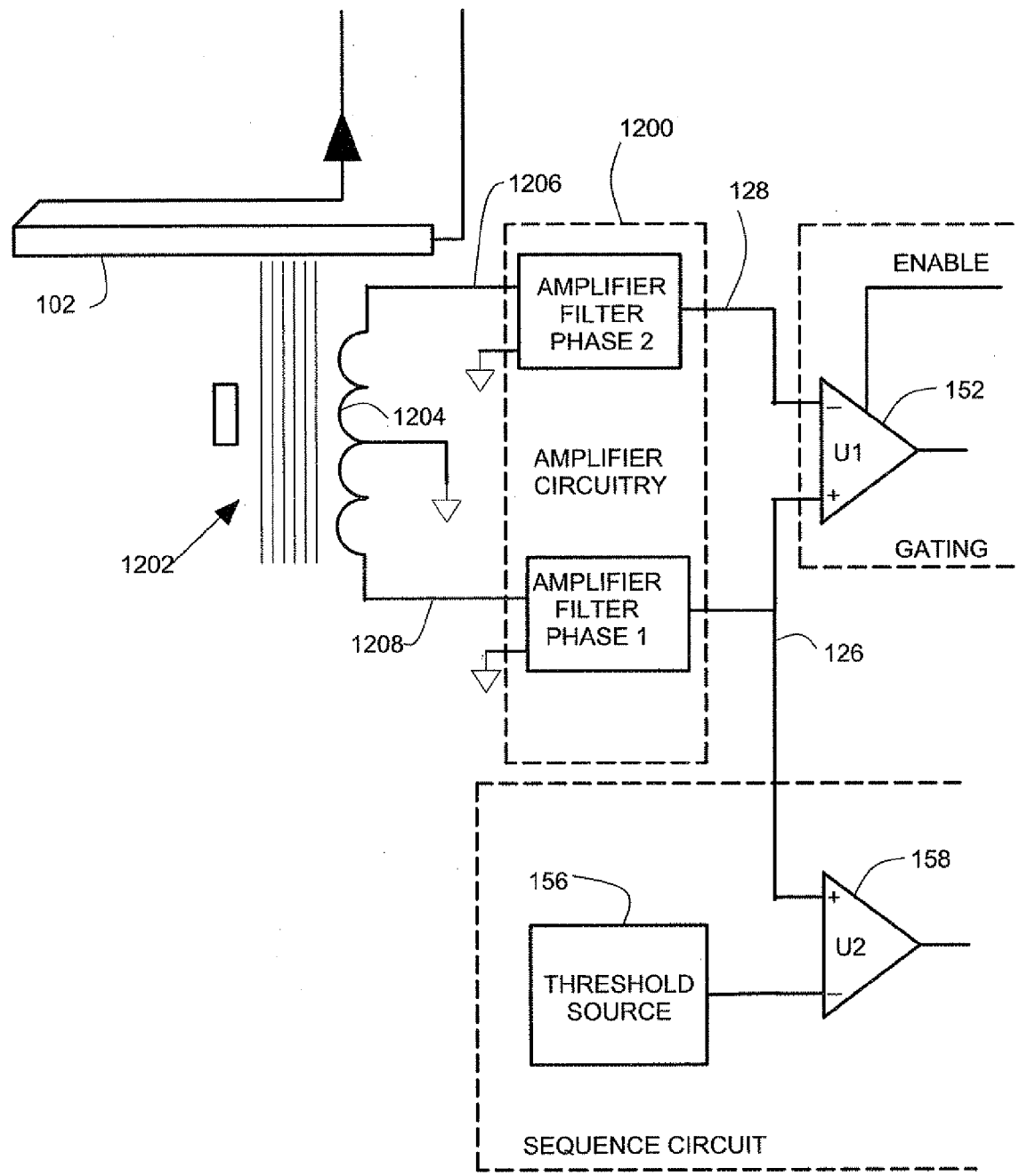
FIG. 12 illustrates a portion of a transducer assembly in which a transducer with a tapped coil produces two outputs with a $\lambda/2$ phase shift.

FIG. 12 illustrates use of a first transducer 1202 that comprises a center-tapped winding 1204. The center-tapped winding 1204 provides transducer outputs 1206, 1208 that are similar to one another, that overlap in time and differ from one another by a 180 degree (λ/2) phase difference. FIG. 12 also illustrates an embodiment 1200 of the amplifier circuitry 124 in FIG. 1. The embodiment 1200 is similar to the embodiment 800 illustrated in FIG. 8. The transducer burst output 126 and the bias burst output 128 overlap one another in time and differ by a phase difference.

Figure 13:
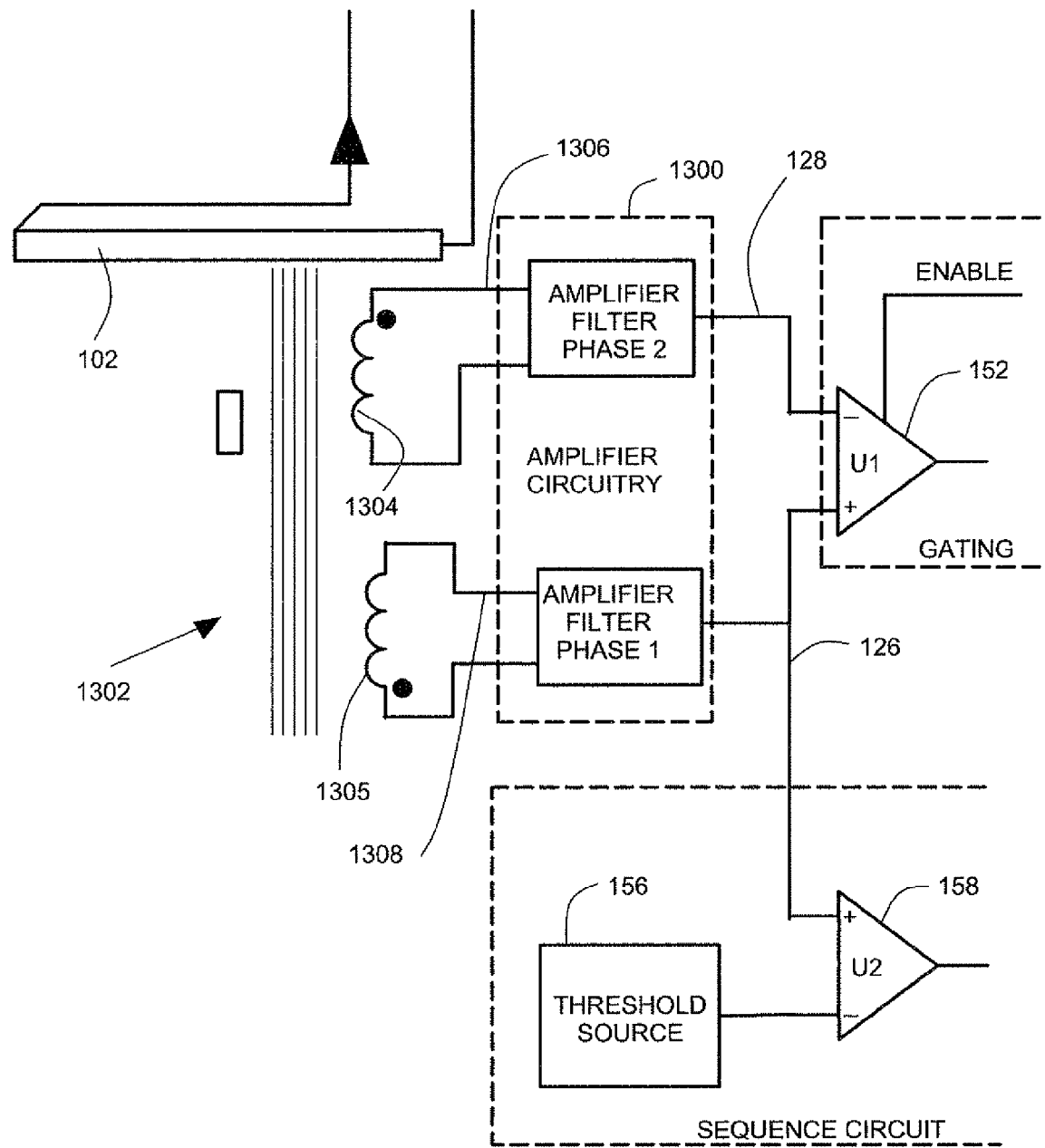
FIG. 13 illustrates a portion of a transducer assembly in which a transducer with two coils produces two outputs with a $\lambda/2$ phase shift.

FIG. 13 illustrates use of a first transducer 1302 that comprises two windings 1304, 1305 that are wound on a common core but that are electrically isolated from one another The windings 1304, 1305 provide transducer outputs 1306, 1308 that are similar to one another, that overlap in time and differ from one another by a 180 degree (λ/2) phase difference. FIG. 13 also illustrates an embodiment 1300 of the amplifier circuitry 124 in FIG. 1. The embodiment 1300 is similar to the embodiment 800 illustrated in FIG. 8. The transducer burst output 126 and the bias burst output 128 overlap one another in time and differ by a phase difference.

Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:

1. An assembly, comprising:
a first magnetostrictive transducer providing a first transducer output;
amplifier circuitry that receives the first transducer output and that generates a transducer output burst and a bias output burst, the transducer output burst and the bias output burst overlapping one another in time and differing by a phase difference; and
a burst processor circuit that receives the transducer output burst and the bias output burst, and that provides a displacement output that is a function of a detection of a time when the transducer output burst and the bias output burst are at a same voltage level.

2. The assembly of claim 1 wherein the phase difference is substantially N +λ/2 where N is an integer greater than or equal to zero and λ is a period of a damped sinusoidal oscillation in the transducer output burst.

3. The assembly of claim 2 wherein N is 0 and the phase difference is substantially λ/2.

4. The assembly of claim 1 wherein the amplifier circuitry comprises an analog delay line that generates the phase difference.

5. The assembly of claim 1 wherein the amplifier circuitry comprises an inverter that generates the phase difference.

6. The assembly of claim 1 wherein the first magnetostrictive transducer provides a second transducer output that differs from the first transducer output by a phase difference and the second transducer output is coupled to the amplifier circuitry.

7. The assembly of claim 6 wherein the first magnetostrictive transducer comprises a center tapped winding that provides the first and second transducer outputs.

8. The assembly of claim 6 wherein the first magnetostrictive transducer comprises a first winding that produces the first transducer output and a second winding, electrically isolated from the first winding, that produces the second transducer output.

9. The assembly of claim 1 further comprising:
a second magnetostrictive transducer that provides a second transducer output to the amplifier circuitry, and
the second magnetostrictive transducer being separated from the first magnetostrictive transducer by a spacing that provides the phase difference.

10. An assembly, comprising:
a first magnetostrictive transducer providing a first transducer output;
amplifier circuitry that receives the first transducer output and that generates a transducer output burst and a bias output burst, the transducer output burst and bias output burst overlapping one another in time and differing by a phase difference;
a transducer circuit that receives the bias output burst and the transducer output burst, the transducer circuit providing a displacement output that is a function of a detection of a time when the transducer output burst and the bias output burst are at a same voltage level; and
a sequence circuit that receives the transducer output burst and that controls sequencing of the transducer circuit.

11. The assembly of claim 10 wherein the transducer circuit comprises a first comparator that compares the transducer output burst to the bias output burst, and the comparator generates a gate output that couples to the sequence circuit.

12. The assembly of claim 11 wherein the sequence circuit comprises a second comparator that compares the transducer output burst to a threshold voltage, and at least one one-shot circuit, and the second comparator triggers the at least one-shot circuit.

13. The assembly of claim 10 and further comprising a control bus that couples control between the transducer circuit and the sequence circuit.

14. The assembly of claim 10 wherein the amplifier circuitry comprises an analog delay line that generates the phase difference.

15. The assembly of claim 10 wherein the amplifier circuitry comprises an inverter that generates the phase difference.

16. The assembly of claim 10 wherein the first magnetostrictive transducer provides a second transducer output that differs from the first transducer output by a phase difference and the second transducer output is coupled to the amplifier circuitry.

17. The assembly of claim 10 further comprising:
- a second magnetostrictive transducer that provides a second transducer output to the amplifier circuitry, and
- the second magnetostrictive transducer being separated from the first magnetostrictive transducer by a spacing that provides the phase difference.

18. A method, comprising:
- generating a transducer output from at least a first magnetostrictive transducer;
- generating a transducer output burst as a function of the transducer output, and generating a bias output burst that overlaps the transducer output burst in time and differing by a phase difference from the transducer output burst; and
- processing the transducer output burst to provide a displacement output that is a function of a detection of a time when the transducer output burst and the bias output burst are at a same voltage level.

19. The method of claim 18 wherein the phase difference is substantially $N+\lambda/2$ where N is an integer greater than or equal to zero and $\lambda$ is a period of a damped sinusoidal oscillation in the transducer output burst.

20. The method of claim 19 wherein N is 0 and the phase difference is substantially $\lambda/2$.

21. An assembly, comprising:
- at least a first magnetostrictive transducer providing a first transducer output;
- amplifier circuitry that receives the first transducer output and that generates a transducer output burst and a bias output burst, the transducer output burst and bias output burst overlapping one another in time and differing by a phase difference; and
- burst processor means for receiving the transducer output burst and the bias output burst, and for providing a displacement output that is a function of a detection of a time when the transducer output burst and the bias output burst are at a same voltage level.

\* \* \* \* \*